(12) United States Patent
Pagnano et al.

(10) Patent No.: US 7,092,767 B2
(45) Date of Patent: Aug. 15, 2006

(54) SYSTEM AND METHOD FOR PROVIDING INFORMATION IN A PARTICULAR FORMAT

(75) Inventors: Marco Aurelio de Oliveira Pagnano, Sertaozinho (BR); Rodrigo Palucci Pantoni, Ribeirao Preto (BR); Paulo Alves Dos Santos Neto, Ribeirao Preto (BR)

(73) Assignee: Smar Research Corporation, Holbrook, NY (US)

( * ) Notice: Subject to any disclaimer, the term of this patent is extended or adjusted under 35 U.S.C. 154(b) by 243 days.

(21) Appl. No.: 10/431,559

(22) Filed: May 7, 2003

(65) Prior Publication Data

US 2004/0024813 A1 Feb. 5, 2004

Related U.S. Application Data

(63) Continuation of application No. 10/209,576, filed on Jul. 31, 2002, now Pat. No. 6,631,298.

(51) Int. Cl.
*G06F 19/00* (2006.01)
(52) U.S. Cl. .......................... 700/19; 715/513; 709/238
(58) Field of Classification Search ................. 700/19; 709/238; 715/513
See application file for complete search history.

(56) References Cited

U.S. PATENT DOCUMENTS

| 5,960,214 | A | | 9/1999 | Sharpe, Jr. et al. |
|---|---|---|---|---|
| 5,971,581 | A | | 10/1999 | Gretta et al. |
| 5,995,916 | A | | 11/1999 | Nixon et al. |
| 6,094,600 | A | | 7/2000 | Sharpe, Jr. et al. |
| 6,112,246 | A | | 8/2000 | Horbal et al. |
| 6,157,943 | A | * | 12/2000 | Meyer ........................ 709/203 |
| 6,223,190 | B1 | | 4/2001 | Aihara et al. |
| 6,298,454 | B1 | | 10/2001 | Schleiss et al. |
| 6,330,517 | B1 | | 12/2001 | Dobrowski et al. |
| 6,363,398 | B1 | | 3/2002 | Andersen |
| 6,370,448 | B1 | | 4/2002 | Eryurek |
| 6,377,859 | B1 | | 4/2002 | Brown et al. |
| 6,446,202 | B1 | | 9/2002 | Krivoshein et al. |
| 6,505,086 | B1 | | 1/2003 | Dodd, Jr. et al. |
| 6,631,298 | B1 | * | 10/2003 | Pagnano et al. .............. 700/19 |
| 6,697,805 | B1 | | 2/2004 | Choquier et al. |
| 2003/0050942 | A1 | | 3/2003 | Ruellan et al. |
| 2004/0103144 | A1 | | 5/2004 | Sallam et al. |
| 2004/0136027 | A1 | | 7/2004 | Zehler |
| 2005/0007249 | A1 | | 1/2005 | Eryurek et al. |

OTHER PUBLICATIONS

Mary Kirtland, "A Platform for Web Services," Microsoft Developer Network, Jan. 2001.
Mario Thron Code Generation by XML-Device Decription (Abstract), Jun. 2001 to Jul. 2002.

* cited by examiner

*Primary Examiner*—Leo Picard
*Assistant Examiner*—Sheela Rao
(74) *Attorney, Agent, or Firm*—Dorsey & Whitney LLP

(57) ABSTRACT

A system for providing information for a process, and a method to utilize such system are provided. In particular, a controller is communicatively coupled to at least one smart field device using an open smart communications protocol, and a server is communicatively coupled to the controller. The server is adapted to receive data associated with the smart field device from the controller. The server may transmit the data in a HTML format, or an at least one image which was generated based on the data. For example, the system further may include a computer system, and the server may transmit the data or the image of the data to such computer system. The computer system may also display the data in the HTML format, and/or the image of the data.

46 Claims, 4 Drawing Sheets

SYSTEM AND METHOD FOR PROVIDING INFORMATION IN A PARTICULAR FORMAT

CROSS-REFERENCE TO RELATED APPLICATION(S)

This application is a continuation application of U.S. patent application Ser. No. 10/209,576 filed Jul. 31, 2002 now U.S. Pat. No. 6,631,298B1, and thus claims priority therefrom under 35 U.S.C. § 120. The entire disclosure of the Parent Application is incorporated herein by reference.

FIELD OF THE INVENTION

The present invention relates generally to a system and method which provide information in a particular format. In particular, the invention is directed towards process control systems and methods in which data or images of data may be displayed without having to download additional software for such display.

BACKGROUND OF THE INVENTION

Conventional process control systems may include a plurality of smart field devices positioned at various locations on a network. The smart field devices may include a processor, and can be temperature sensors, pressure sensors, flow rate sensors, valves, switches, etc., or combinations thereof. The smart field devices may be communicatively coupled to each other using an open smart communications protocol. Such open smart communications protocols may include HART®, PROFIBUS®, FOUNDATION® Fieldbus, etc. These open smart communications protocols may enable the smart field devices that are manufactured by different manufactures to be used together in the same system. These conventional systems also may include a controller communicatively coupled to each of the smart field devices using the open smart communications protocol, and a server communicatively coupled to the controller using, for example, an Ethernet connection. Moreover the controller may include a processor, and can receive data from each of the smart field devices.

In operation, each smart field device may perform a function within the control process. For example, a temperature sensor may measure a temperature of a liquid, a pressure sensor may measure pressure within a container, a flow rate sensor may measure a flow rate of the liquid, etc. Similarly, valves and switches may open to provide or increase the flow rate of the liquid, or can close to stop the flow of the liquid or to decrease the flow rate of the liquid. After the smart field devices obtain measurements of various process parameters, or after the smart field devices open or close the valves or switches, the smart field devices may communicate with the controller. For example, the smart field devices may forward the data to the controller, and the controller can implement a control procedure based on the received data.

Moreover, the controller may forward the data to a server, which may store the data in a database in a particular format, e.g., a JAVA format, an Active X format, etc. Subsequently, a computer system may access the database to retrieve the data, and also downloads an appropriate software program, e.g., JAVA applet, Active X applet, etc., to allow the user of the computer system to view the data. After the computer system receives the data and downloads the appropriate software program, the computer system may display such data in the particular format, e.g., JAVA format, Active X format, etc.

However, when the computer system downloads the software program, the computer system may be exposed to computer executable viruses which can be activated or obtained during such software downloads. Moreover, when the computer system is a slower or older computer system, downloading such software may take more than a desired or acceptable amount of time. Further, because the computer system accesses the database, the computer system may have access to proprietary information, which can be obtained by an unauthorized user.

SUMMARY OF THE INVENTION

Therefore, a need has arisen to provide systems and methods which overcome the above-described and other shortcomings of the conventional systems and processes. One of the advantages of the present invention is that a pure hypertext mark-up language (HTML) page including data or an image of the data, can be transmitted to the computer system. For example, the image of the data can be a plurality of sequential images including the data which depict changes in the data over time. Consequently, a user of the computer system may display the data using any computer system, e.g., a personal computer, palm pilot, cellular phone, etc., using any browser, without downloading additional software. Another advantage of the present invention is that the computer system preferably does not have access to proprietary information.

According to an exemplary embodiment of the present invention, a system and method for providing information for a process are provided. In this embodiment, a controller is communicatively coupled to at least one smart field device using an open smart communications protocol, and a server is communicatively coupled to the controller. Such open smart communications protocol may include a Foundation Fieldbus protocol, a PROFIBUS protocol, a HART protocol, etc. The server is adapted to receive data associated with the smart field device from the controller. The server also may be adapted to transmit the data in a HTML format, or may be adapted to transmit an image which was generated based on the data. For example, the server can be adapted to transmit a plurality of images which include the data and depict changes in the data over time. When the server is adapted to transmit the data in the HTML format, the server may further be adapted to store the data in an active server page format. For example, the system also may include a computer system, and the server may transmit the data or the image of the data to the computer system. The computer system then can display the data in the HTML format, or may display the image of the data.

In another exemplary embodiment of the present invention, the smart field device includes a first processor, the controller includes a second processor, and the second processor forwards the data to the server. The smart field device can be a temperature sensor, a pressure sensor, a flow rate sensor, a valve and/or a switch. Moreover, the data can include values associated with at least one measurement performed by the smart field device, such as a temperature, pressure, flow rate, etc. The data also can include an amount of time that the at least one smart field device has been in operation, a position of the valve, a position of the switch, etc.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION

Preferred embodiments of the present invention and their advantages may be understood by referring to FIGS. 1–4, like numerals being used for like corresponding parts in the various drawings.

Figure 1:
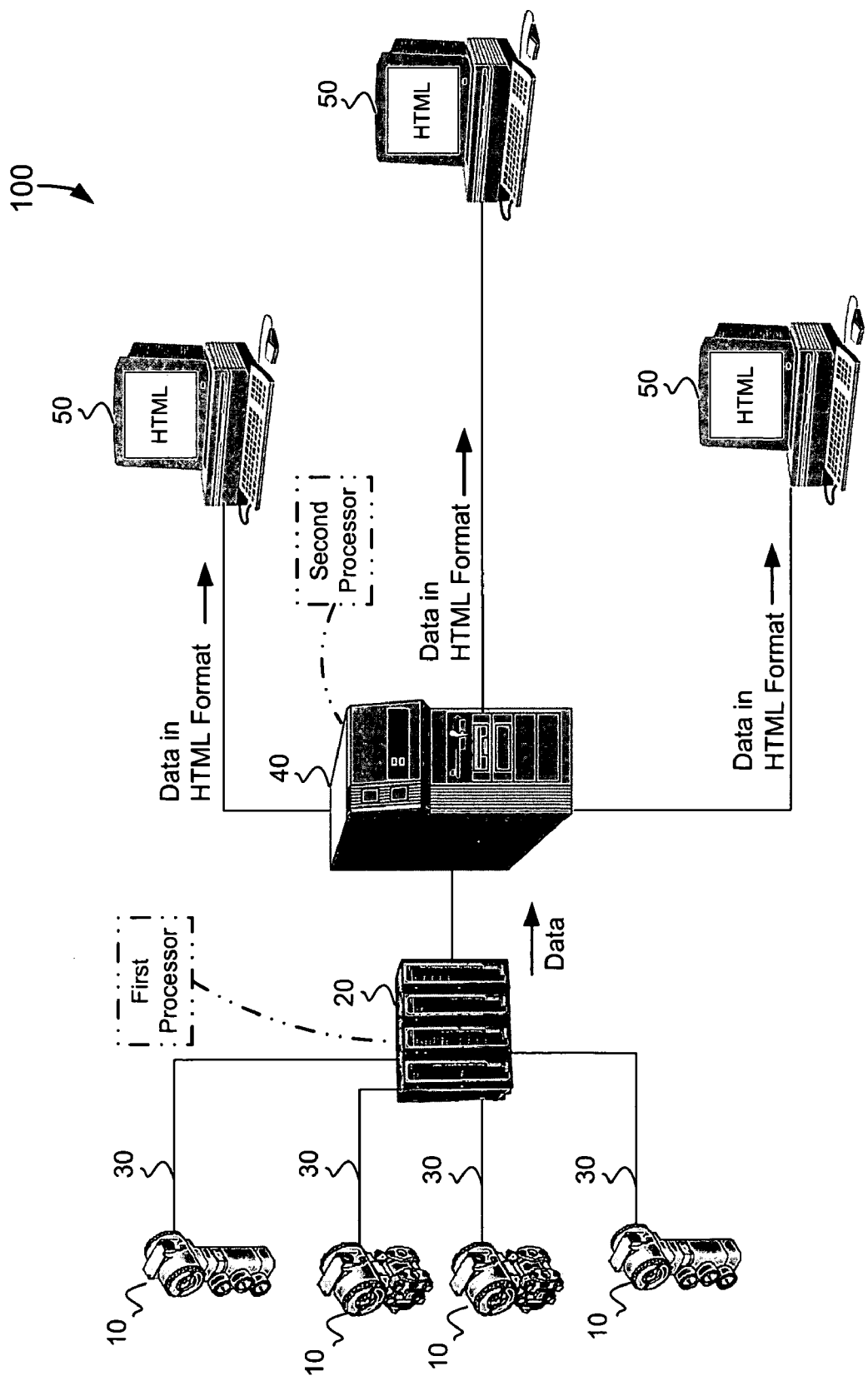
FIG. 1 is a schematic of a system according to an exemplary embodiment of the present invention.

Referring to FIG. 1, a system for providing information for a process 100 according to a first embodiment of the present invention is provided. The system 100 may include at least one smart field device 10 positioned on a network, and each smart field device 10 may include a processor (not shown). Each of the smart field devices 10 may be a sensor, a control element, etc. Such sensors may include temperature sensors, pressure sensors, flow rate sensors, etc., and the control elements may include valves, switches, etc. Moreover, each smart field device 10 may be adapted to measure or control certain parameters of a process or processes which is/are controlled by the system by using function blocks (not shown). In an exemplary embodiment of the present invention, each smart field device 10 may be communicatively coupled to at least one other smart field device 10 using an open smart communications protocol network 30. Such open smart communications protocols may include protocols by HART®, PROFIBUS®, FOUNDATION® Fieldbus, etc.

The system 100 also may include a controller 20. The controller 20 may include a processor (not shown), and also can be communicatively coupled to each smart field device 10 using the open smart communications protocol network 30. The system 100 further may have a server 40 communicatively coupled to the controller 20. In the exemplary embodiment of the present invention, the server 40 may be communicatively coupled to the controller 20 using an Ethernet connection. In operation, each of the smart field devices 10 may collect data associated with the function block of that particular smart field device 10.

For example, in a case when the smart field device 10 is a sensor, the data may include values associated with the temperature, pressure, flow rate, etc. detected by the smart field device 10 at various times. When the smart field device 10 is a control element, the data may include values associated with the position of the smart field device 10 at various times. Moreover, when the smart field device 10 is a sensor or a control element, the data may further include values associated with historical data, e.g., the number of hours that the smart field device 10 has been in operation. The smart field devices 10 subsequently may forward the data to the controller 20. The controller 20 may collect data from each of the smart field devices 10, and can then forward the collected data to the server 40. Moreover, the server 40 may be adapted to store the data in an active server page format, and to transmit the data in a HTML format.

In another embodiment of the present invention, the system 100 further may include at least one computer system 50. The computer system 50 may include a browser (not shown), and can be communicatively coupled to the server 40. For example, the computer system 50 may be communicatively coupled to the server 40 using an Intranet connection, an Internet connection, etc. The computer system 50 may be adapted to forward a request to the server 40 for the data, receive the data from the server 40 in the HTML format, and display the data to a user (not shown) in such format.

Specifically, the user of the computer system 50 may use this computer system 50 to generate a request for the data, and the computer system 50 can forward this request to the server 40. The server 40 subsequently may access a database to locate the active server page requested by the user. Because the data is stored in the active server page format, the server 40 also may execute the active server page code included in the active server page when the server 40 locates the active server page. After the server 40 executes the active server page code, such code may preferably be removed from the active server page. For example, at least one firewall at the server 40 may be utilized to filter out any code so that only the HTML code remains thereon. Subsequently, the HTML page may be transmitted to the computer system 50, which can display the data in the HTML format. In this exemplary embodiment of the present invention, because the code is executed by the server 40 and not by the computer system 50, it is not necessary for the computer system 50 to download additional software so as to allow the user to view the data. In this manner, the computer system 50 is not exposed to any computer executable viruses which may be activated or obtained during such software downloads. Moreover, because the code is removed from the page before the data is forwarded to the computer system 50, any proprietary information stored at the server 40 may be more readily protected. Further, the user may access the data using any computer-based system, e.g., a personal computer, palm pilot, cellular phone, etc., using any commercially available browser. This is because the data in the HTML format is forwarded to the computer system 50, with the HTML being an open language.

Figure 2:
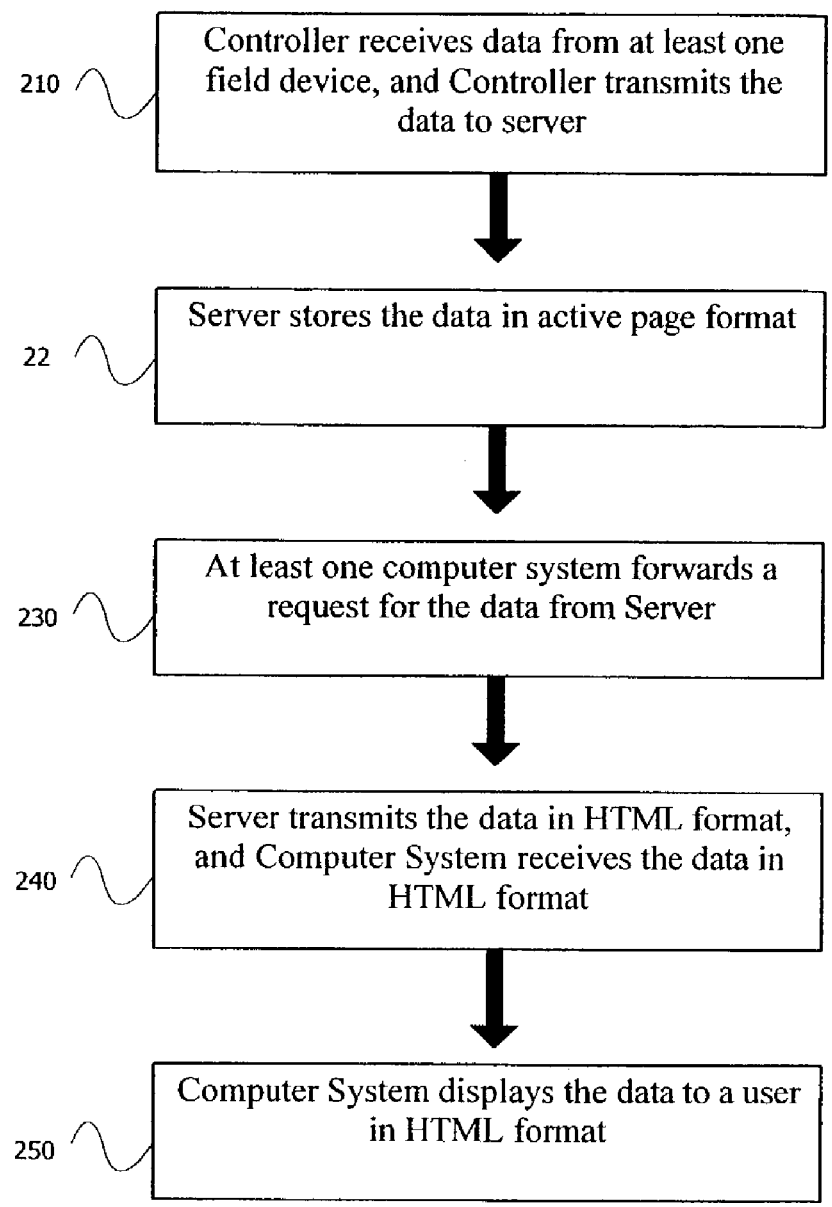
FIG. 2 is a flow-chart of an exemplary method according to the present invention for employing the system of FIG. 1.

Referring to FIG. 2, an exemplary method 200 which employs the system 100 of FIG. 1 is depicted. As shown in FIG. 2, in step 210, the controller 20 may receive data associated with the at least one smart field device 10, and the controller 20 may transmit the data to the server 40. In step 220, the server 40 may store the data in the active page format in an internal or external database, and in step 230, the computer system 50 may forward a request to the server 40 to provide the data. In step 240, the server 40 may transmit the data in the HTML format to the computer system 50. Thereafter, in step 250, the computer system 50 may display the data to the user in the HTML format. As indicated above, the computer system 50 does not need to download any additional software to display the data due to the fact that the data is displayed in the HTML format.

Figure 3:
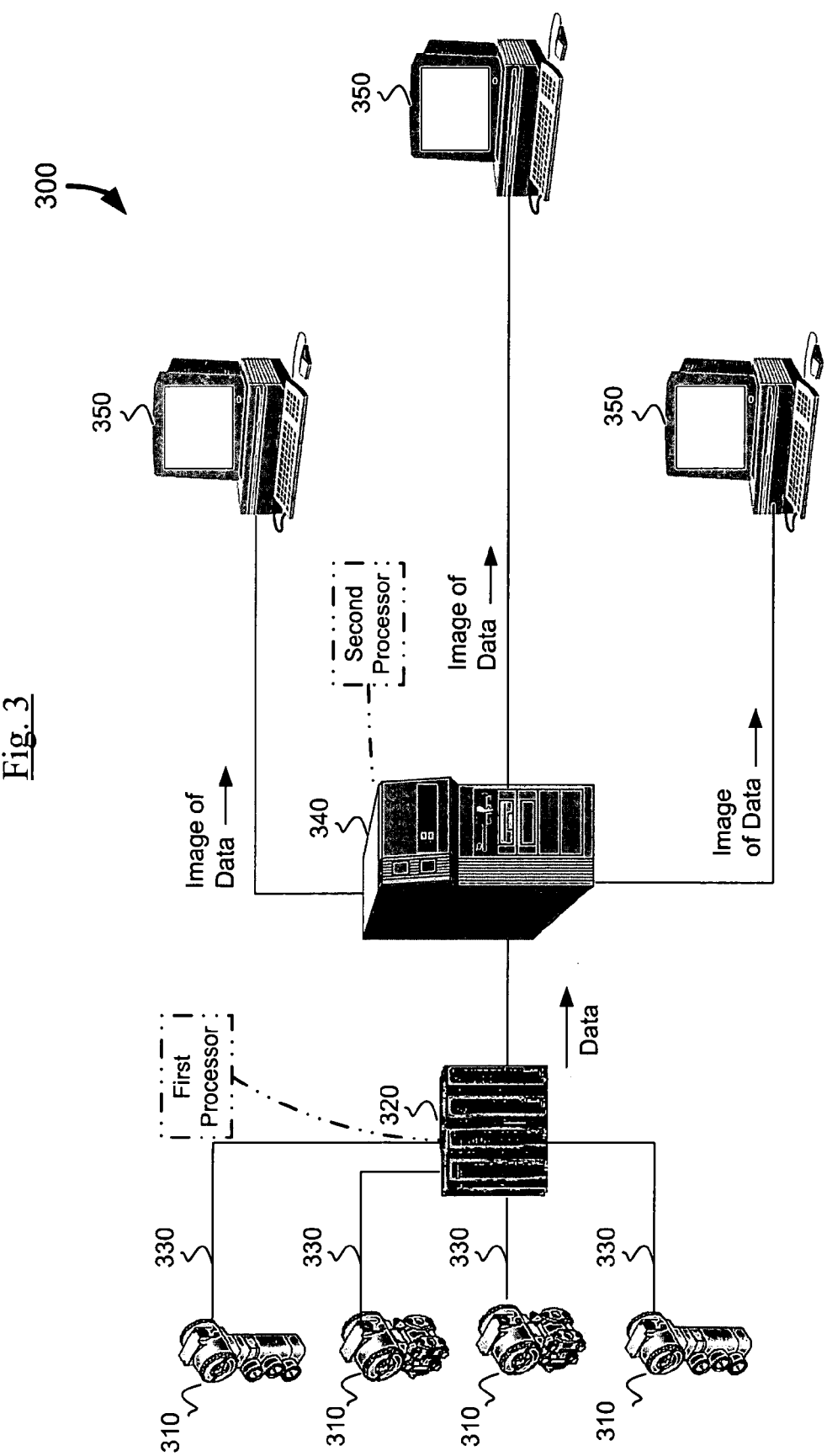
FIG. 3 is a schematic of the system according to another exemplary embodiment of the present invention.

Referring to FIG. 3, a system 300 for providing information for a process according to a second embodiment of the present invention is depicted. The features, advantages and capabilities of the second embodiment of the system of the present invention are substantially similar to the above-described features and advantages of the first embodiment of the system of the present invention, and thus are not further discussed with respect to the second embodiment of the present invention in detail below. Similarly to the system 100, the system 300 may include at least one smart field device 310 positioned on a network, and a controller 320 communicatively coupled to each of the smart field devices 310 using an open smart communications protocol 330. The system 300 also may include a server 340 communicatively coupled to the controller 320. In operation, each of the smart field devices 310 may collect data associated with the function block of that particular smart field device 310, and may transmit the data to the controller 320.

The system 300 may further include at least one computer system 350 communicatively coupled to the server 340. The computer system 350 may be adapted to forward a request to the server 340 for an image which the server 340 generated based on the data. The computer system 350 also may be adapted to receive the image of the data from the server 340, and display the image of the data to a user (not shown).

Specifically, the user of the computer system 350 can use the system 350 to generate a request for the image of the data, and the computer system 350 may forward the request to the server 340. The server 340 subsequently may access the database, compress the image of the data, and forward the compressed image to the computer system 350. For example, the image of the data may be in JPEG format, GIF format, etc. Moreover, the image may be expanded when the computer system 350 receives the image. In this exemplary embodiment of the present invention, because the image of the data (not the data itself) is transmitted to the computer system 350, it is not necessary for the computer system 350 to download any additional software so as to allow the user to view the image. In this manner, the computer system 350 also is not exposed to any computer executable viruses which may be activated or obtained during such software downloads. Further, the user may view the image of the data using any computer-based system, e.g., a personal computer, palm pilot, cellular phone, etc., using any browser.

In a variation of this exemplary embodiment of the present invention, the server 340 can access the database, and may transmit a plurality of sequential images of the data via wireless or wired communication, as described above. For example, the plurality of sequential images of the data can depict a change in the data over time. As such, the user of the computer system 350 can view a sequential progression of the data, e.g., can view the data as if the data were not-static data, and provide an illusion of real-time data being continuously updated on the display.

Figure 4:
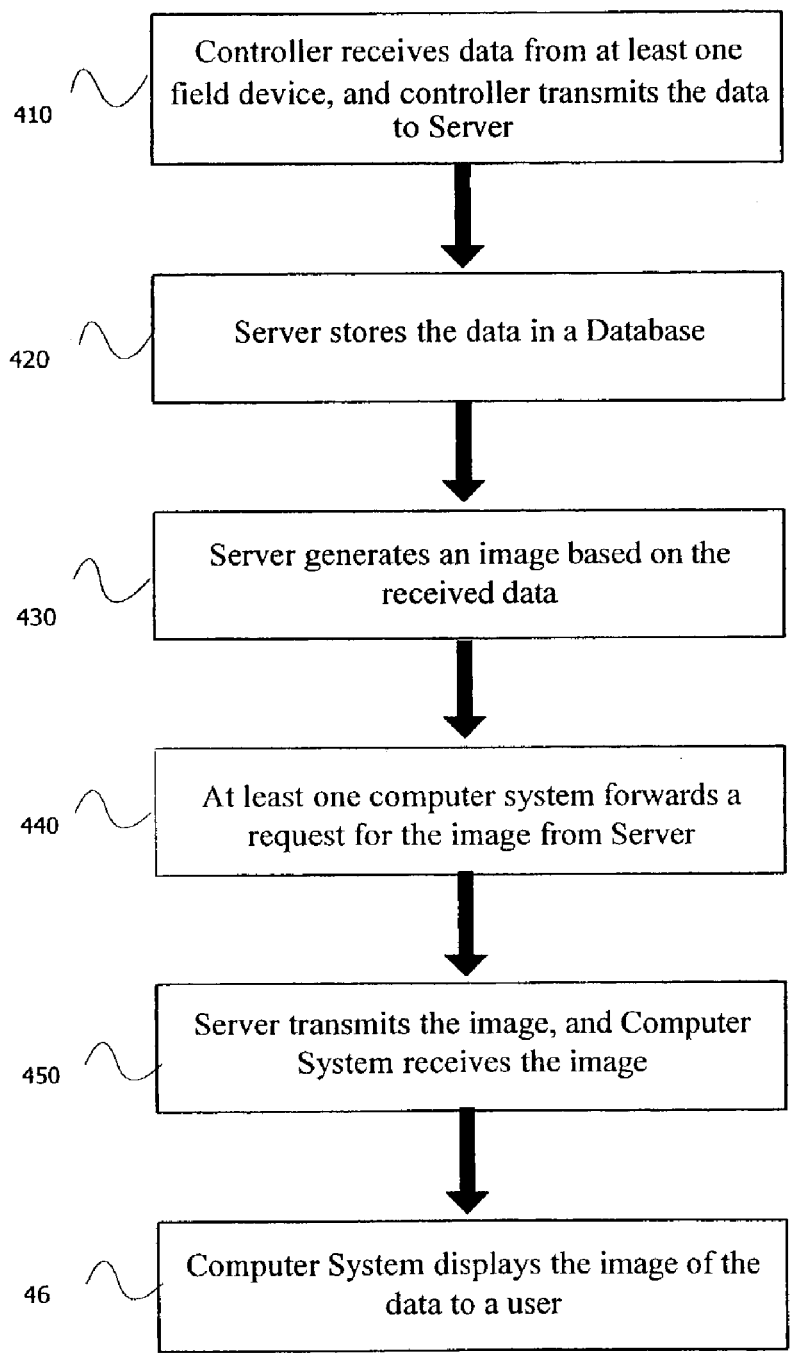
FIG. 4. is a flow-chart of another exemplary method according to the present invention for employing the system of FIG. 3.

Referring to FIG. 4, an exemplary method 400 for employing the system 300 of FIG. 3 is depicted. In step 410, the controller 320 may receive data from the smart field device 310, and the controller 320 may transmit the data to the server 340. In step 420, the server 340 may store the data in an internal or external database. In step 430, the server 340 may generate an image based on the received data, and in step 440, the computer system 350 may forward a request to the server 340 for the image of the data. In step 450, the server 340 can compress the data and transmit the image of the data to the computer system 350. In a modification of this exemplary embodiment of the present invention, the server 340 can transmit a plurality of sequential images of the data to the computer system 350. For example, the plurality of sequential images of the data can depict a change in the data over time. Moreover, in step 460, the computer system 350 may expand the image and display the image of the data to the user.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. An information system, comprising:
    a controller communicatively coupled to at least one smart field device using an open smart communications protocol; and
    a server communicatively coupled to the controller, wherein the server is adapted to receive data associated with the at least one smart field device from the controller, and to transmit the data in a HTML format.

2. The system of claim 1, wherein said server further is adapted to store the data in an active server page format.

3. The system of claim 1, further comprising at least one computer system communicatively coupled to the server, wherein the at least one computer system is adapted to forward a request to receive the data from the server in the HTML format, and display the data in the HTML format.

4. The system of claim 1, wherein the at least one smart field device includes a first processor, and the controller includes a second processor.

5. The system of claim 4, wherein the second processor forwards the data to the server.

6. The system of claim 1, wherein the open smart communications protocol is a Foundation Fieldbus protocol.

7. The system of claim 1, wherein the open smart communications protocol is at least one of a PROFIBUS protocol and a HART protocol.

8. The system of claim 1, wherein the at least one smart field device is at least one of a temperature sensor, a pressure sensor, a flow rate sensor, a valve and a switch.

9. The system of claim 1, wherein the data includes values associated with at least one measurement performed by the at least one smart field device, the at least one measurement including at least one of a temperature, pressure and flow rate.

10. The system of claim 1, wherein the data includes an amount of time that the at least one smart field device has been in operation.

11. The system of claim 1, wherein the data includes at least one of a position of a valve, and a position of a switch at various times during an operation of the at least one smart field device.

12. An information system, comprising:
    a controller communicatively coupled to at least one smart field device using an open smart communications protocol;
    a server communicatively coupled to the controller, wherein the server is adapted to receive data from the controller, and to transmit at least one image of the data.

13. The system of claim 12, wherein the server is further adapted to store the data and to generate the at least one image of the data based on the received data, and wherein the at least one image of the data comprises a plurality of sequential images of the data depicting a change in the data over time.

14. The system of claim 12, further comprising at least one computer system communicatively coupled to the server, wherein the at least one computer system is adapted to forward a request to receive the at least one image of the data from the data from the server, and display the at least one image of the data.

15. The system of claim 12, wherein the at least one smart field device includes a first processor, and the controller includes a second processor.

16. The system of claim 15, wherein the second processor forwards the data to the server.

17. The system of claim 12, wherein the open smart communications protocol is a Foundation Fieldbus protocol.

18. The system of claim 12, wherein the open smart communications protocol is at least one of a PROFIBUS protocol and a HART protocol.

19. The system of claim 12, wherein the at least one smart field device is at least one of a temperature sensor, a pressure sensor, a flow rate sensor, a valve, and a switch.

20. The system of claim 12, wherein the data includes values associated with at least one measurement performed by the at least one smart field device, the at least one measurement including at least one of a temperature, pressure and flow rate.

21. The system of claim 12, wherein the data includes an amount of time that the at least one smart field device has been in operation.

22. The system of claim 12, wherein the data includes at least one of a position of a valve, and a position of a switch at various times during an operation of the at least one smart field device.

23. The system of claim 12, wherein the at least one image of the data is transmitted in at least one of a JPEG format and a GIF format.

24. A method for providing information for a process, comprising the steps of:
receiving data by a server from a controller, wherein the data is associated with at least one smart field device communicatively coupled to the controller using an open smart communications protocol; and
transmitting the data in an HTML format.

25. The method of claim 24, further comprising the step of storing the data in an active server page format.

26. The method of claim 24, further comprising the steps of:
forwarding a request to receive the data from the server, wherein the request is forwarded by a computer system;
receiving the data from the server in the HTML format; and
displaying the data in the HTML format.

27. The method of claim 24, wherein the at least one smart field device includes a first processor, and the controller includes a second processor.

28. The method of claim 24, wherein the open smart communications protocol is a Foundation Fieldbus protocol.

29. The method of claim 24, wherein the open smart communications protocol is at least one of a PROFIBUS protocol and a HART protocol.

30. The method of claim 24, wherein the at least one smart field device is at least one of a temperature sensor, a pressure sensor, a flow rate sensor, a valve and a switch.

31. The method of claim 24, wherein the server is communicatively coupled to the controller using an Ethernet connection.

32. The method of claim 24, wherein the data includes values associated with at least one measurement performed by the at least one smart field device, the at least one measurement including at least one of a temperature, pressure and flow rate.

33. The method of claim 24, wherein the data includes an amount of time that the at least one smart field device has been in operation.

34. The method of claim 24, wherein the data includes at least one of a position of a valve, and a position of a switch at various times during an operation of the at least one smart field device.

35. A method for providing information for a process, comprising the steps of:
receiving data by a server from a controller, wherein the data is associated with at least one smart field device communicatively coupled to the controller using an open smart communications protocol; and
transmitting at least one image of the data.

36. The method of claim 35, further comprising the step of storing the data, and wherein the at least one image of the data comprises a plurality of sequential images of the data depicting a change in the data over time.

37. The method of claim 35, further comprising steps of:
forwarding a request to receive the at least one image of the data from the server, wherein the request is forwarded by the controller;
receiving the at least one image of the data from the server; and
displaying the at least image of the data.

38. The method of claim 35, wherein the at least one smart field device includes a first processor, and the controller includes a second processor.

39. The method of claim 35, wherein the open smart communications protocol is a Foundation Fieldbus protocol.

40. The method of claim 35, wherein the open smart communications protocol is at least one of a PROFIBUS protocol and a HART protocol.

41. The method of claim 35, wherein the at least one smart field device is at least one of a temperature sensor, a pressure sensor, a flow rate sensor, a valve and a switch.

42. The method of claim 35, wherein the server is communicatively coupled to the controller using an Ethernet connection.

43. The method of claim 35, wherein the data includes values associated with at least one measurement performed by the at least one smart field device, the at least one measurement including at least one of a temperature, pressure and flow rate.

44. The method of claim 35, wherein the data includes an amount of time that the at least one smart field device has been in operation.

45. The method of claim 35, wherein the data includes at least one of a position of a valve, and a position of a switch at various times during an operation of the at least one smart field device.

46. The method of claim 35, wherein the at least image of the data is transmitted in at least one of a JPEG format and a GIF format.

* * * * *